J. SHAW.
METHOD OF PRODUCING MOVING PICTURES IN COLORS.
APPLICATION FILED JULY 31, 1917.
1,300,887. Patented Apr. 15, 1919.
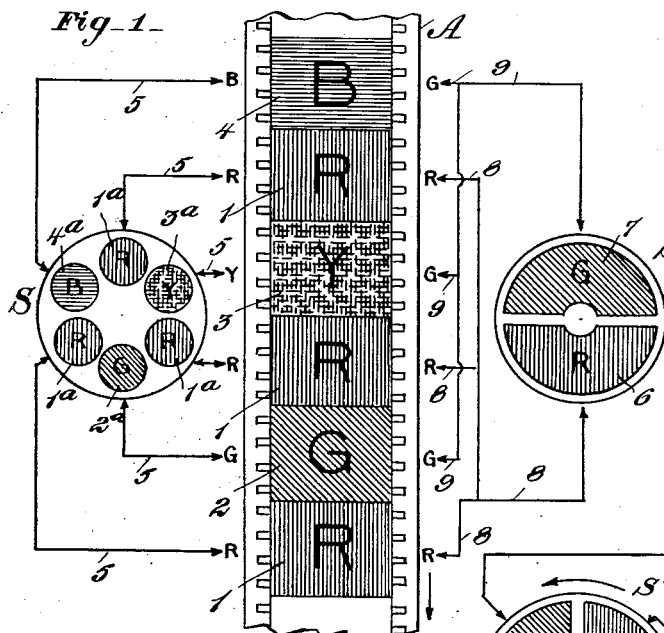
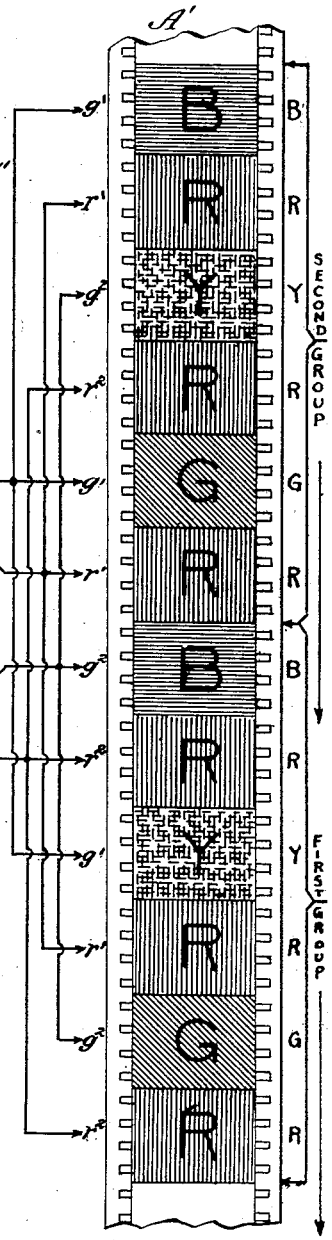
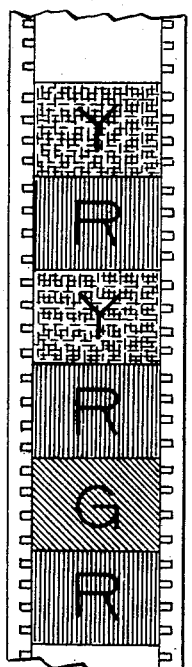
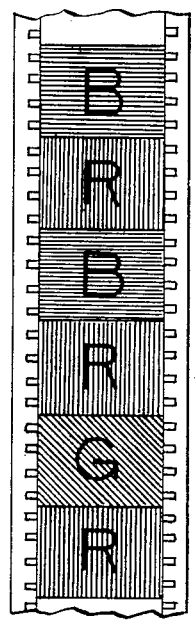
WITNESSES
Frank C. Palmer.
C. Bradway.
INVENTOR
Joseph Shaw.
BY
ATTORNEYS

UNITED STATES PATENT OFFICE.

JOSEPH SHAW, OF NEW YORK, N. Y., ASSIGNOR TO RAINBOW PICTURES CORPORATION, A CORPORATION OF NEW YORK.

METHOD OF PRODUCING MOVING PICTURES IN COLORS.

1,300,887.  Specification of Letters Patent.  Patented Apr. 15, 1919.

Application filed July 31, 1917. Serial No. 183,683.

*To all whom it may concern:*

Be it known that I, JOSEPH SHAW, a citizen of the United States, and a resident of the city of New York, borough of the Bronx, in the county of the Bronx and State of New York, have invented a new and Improved Method of Producing Moving Pictures in Colors, of which the following is a full, clear, and exact description.

This invention relates more particularly to the art of taking and projecting motion pictures in colors, wherein the successive pictures are taken on orthochromatic or panchromatic negative film with the aid of recurring color filters and positive transparencies of such films are similarly projected.

The invention has for its general object to provide means whereby the natural shades and tones of the subject or scene photographed can be more nearly reproduced on projection; and the more specific object is to reduce to a minimum the "flicker" effect in color moving picture projection which is very apparent in the moving picture color methods that have been tried up to this date.

Analyzing the problem of "flicker" common to moving pictures in colors I have made comparison with the regular "black and white" moving pictures and it occurred to me that the trouble could be remedied if the positive film ready for projection in colors could be made of such quality that the differently color separated picture sections comprising the image should not only show a difference in the opacities of the color separated picture sections, thus controlling and selecting the colored light which it permits to pass, but these opacities should be arranged and regulated to such a degree that if projected without color filters they should show, with the exception of the red color separated picture sections, images closely resembling the "black and white" moving picture where the amount of "flicker" is usually at a minimum.

I based my theory which I later found to be a fact, that the disturbance or "flicker" which is perceived by the retina of the eye is due to violent light changes caused by quickly and successively moving these picture section opacities alternating in contrast of strong light and shadows, what in one of the positive picture image sections is expressed as a transparent light passing spot and as an opaque light preventing spot in the next following picture image section.

For illustration; if we will think of the spectrum as one chain of graduated colors and hues extending from one end of the spectrum to the other, as soon as we will take any link out we break the continued line of the chain and certain hues or shades of colors will be missing; the gradual color scale will be disturbed, the absorption bands will be sharply defined and a "gap" between the primary colors of the spectrum will be formed which would cause upon the retina of the eye a sensation similar to looking upon a board marked with black and white checkers, a sensation causing an immediate disturbance to the eye, and if such a sensation is continued for a length of time, the eye fatigues and "flicker" increases in proportion.

And so, indeed, a similar sensation of "gaps" is caused upon the retina when different sharp cut primary color filters are used in forming the different color separated opacities on the film. Besides causing "flicker" these "gaps" prevent the eye from perceiving the colors in their natural shades and hues, as each missing link represents a color shade or hue which is necessarily a part of the spectrum.

Further analyzing the "gaps" I have observed in the projection of the different primary colors, that the "flicker" was mostly trying upon the eye when green or blue-green colored light was being passed by sharply cut color separated opacities, the red colored light being passed by the red color separated picture opacities did not cause much "flicker" or pulsating effect upon the eye.

From that time on my efforts were directed to picture section opacities representing separations of wave lengths different from red, by regulating the opacities translating the photographic details from orange, green, yellow to blue shades of the subjects to such an extent that when a positive was made from a thus regulated negative film and was projected for instance in monochrome, say green light, a graduated scale of different hues of green color was perceived by me ranging from deep green to a very light blue green shade, according to the natural colors of the subject; the green light sifting through the translucent or semi-translucent varying opacities of the picture image sections and forming these different hues of green color without any "gaps."

Then when the so regulated picture image opacities were successively projected in green colored light in combination with alternating picture section opacities colored in red light, not only was "flicker" materially reduced but remarkably true shades of different color combinations very closely approaching natural colors formed by the mixture of red colored light alternating with different hues and delicate shades of green light filtering through the differently shaded and graduated opacities representing photographic details from orange, green, yellow to blue shades of colors of the subject or scene.

In order to register on the moving picture orthochromatic or panchromatic negative film the color selected picture image section opacities for the purpose above described I use in the taking camera in front of the negative film a movable color screen geared in any approved manner to travel in synchronism with the film having six openings, each filled with one color filter, these six color filters comprising three color filters of short wave length and consisting of green, yellow and blue color respectively and three color filters of a long wave length and each consisting of a red color only, so arranged that each of the three red color filters alternates to form a pair with one of the three different color filters of the short wave length. When thus arranged and used in combination with an orthochromatic or panchromatic negative film these six color filters register lengthwise of the film picture image section opacities in the following order: red, green; red, yellow; red, blue; thus forming an unbroken chain of color separations having no "gaps."

A positive is made from this negative film and although red, green, yellow and blue color filters were used in the taking, I can project the positive with two primary color filters only, namely, red and green. The picture image section of red color selections passing red colored light and the picture image sections of green, yellow and blue color selection each passing green colored light.

I believe I am the first to use in taking moving pictures in colors a movable color screen filled with six color filters so arranged and selected to register on the panchromatic or orthochromatic negative film groups of six color selected picture image sections, three of which represent red color value and the balance of three color selected picture image sections representing green, yellow and blue values and so arranged that the picture image sections of red color selection are registered every other one and the picture image sections of green, yellow and blue color selection are each registered once in every group of six picture image sections; when a positive is made therefrom to project the picture image sections of red color selection in a light of red color and the picture image sections of green, yellow and blue color selection each in a light of green color.

Thus, in each group of six picture image sections, the red images alternating in projection with the green images, and each green image showing a different density or shade of green color influenced by the difference in the opacities of the green, yellow and blue color selections form in the projection of each group of six picture image sections three different pairs of color mixtures, and when overlapped in the eye of the observer by persistency of vision produces moving pictures in colors, very nearly approaching colors of nature with a minimum amount of flicker; or the positive film bearing the successive groups of the six picture image sections of color selection can be directly tinted, dyed or toned photographically, in which case the picture image sections of red color selection will bear a red color tint and the picture image sections of green, yellow and blue color selection will each bear a green color tint, and the projection of the positive film will take place without any recurring color filters.

It will be clear from the above that although the positive film is projected with the aid of two primary color filters only, the projection effects a wider range of color tints than has been possible with any other method heretofore, but by my method of taking the pictures it is possible to still more enhance and increase the variety of tints in the color combinations by utilizing in projection a recurring color screen having four openings, two of which are filled with red color filters, each being of a different shade, for instance, pure red and orange-red; the other two openings of the screen filled with green color filters, likewise differing in shade, a blue-green and yellow-green, and so arranged to move in relation to the film that as one picture image section appears at the gate of the projector, one color filter passes in the path of the light, thus in one complete revolution of the color screen four picture image sections will have passed the gate, thus providing means whereby the picture image sections of red color selection can be alternately colored by pure red and orange-red filters and the images of green, yellow and blue color selection can be colored by alternating blue-green and yellow-green filters.

In the accompanying drawings

Figure 1 is a diagrammatic view showing a section of a film and the relation of the picture image sections to the picture-taking screen when the film is regarded as a negative and to the projection screen when the film is regarded as a positive;

Fig. 2 is a diagrammatic view showing a positive film with its picture image sections operatively related to the color screen used in projection; and Figs. 3 and 4 are fragmentary views of films having different orders of colored picture image sections.

Referring to Fig. 1, A designates sufficient of a film to include a group of picture image sections of which alternate sections 1 are red, as designated by the letter R, and the sections 2, 3 and 4 intermediate adjacent sections 1 are green, yellow and blue, as designated by the letters G, Y and B. Adjacent the film, which is to be regarded as a negative, is a color screen S which moves in synchronism with the film by any approved manner and is employed in taking of the moving pictures. This screen has a plurality of red color filters $1^a$, through which the picture sections 1 of the film group are exposed. The screen also has green, yellow and blue filters $2^a$, $3^a$ and $4^a$, respectively arranged in alternate relation to the red filters. The relation of the color filters to the picture image sections can be traced by the connecting arrow lines 5.

In Fig. 1 is shown the screen S', which is used in projecting the moving picture image sections. This screen has two filters 6 and 7 which are red and green, as designated by the letters R and G. This screen is moved in such relation to the film A, which is assumed to be a positive in this explanation of the screen S', that the red filter 6 will register with the successive red image sections 1 of the film and the green filter 7 will register alternately with the green, yellow and blue picture sections 2, 3 and 4, this relation being indicated by the arrow lines 8 and 9, respectively.

Fig. 2 shows a portion of a negative A' with two groups of moving picture sections, and the projecting screen $S^2$ has two groups of red and green filters designated R'—G' and $R^2$—$G^2$, respectively. The relation in which these various filters register with the image sections of the film can be traced by the arrow lines designated respectively $g'$—$r'$, $g^2$—$r^2$.

The films in Figs 3 and 4 show color selected moving picture image sections arranged in different orders, wherein R stands for red, G for green, Y for yellow and B for blue.

It will be clear by reference to Fig 2 that the picture image sections of green, yellow and blue color selection in one group of six picture image sections are differently affected by the G' and $G^2$ filters than they are in the next following group. In a given group, for instance, the picture image sections of green and blue color selection are affected by the $G^2$ filter and the picture image section of yellow color selection is affected by the G' filter, but in the next following group the order reverses—the picture image sections of green and blue color selection will be affected by the G' filter and the picture image section of yellow color selection by the $G^2$ filter. Also, in every group, that every other picture image section of red color selection is affected by the R' filter and the intermediate picture image sections of red color selection by the $R^2$ filter.

In further reference to the drawings, Fig. 2 illustrating the projecting method with four filters, the R' is a pure red and the $R^2$ is an orange-red filter; the G' is a yellow green filter and the $G^2$ a blue-green filter. Assuming that the screen revolves to the left the R' filter will follow the G' and the $R^2$ filter will follow the $G^2$ and when in combination with the differently color selected picture image sections, projected at a speed of about thirty pictures per second each two successive picture image sections are alternately colored by the red and green filters and are overlapped by persistency of vision, thus forming pairs, the color combinations of which are being successively varied, due to the changing relation of the different color filters in combination with the varied color selections of the picture image sections, for example, as shown in the drawing, the film passing downward in a given group of six picture image sections, beginning with a picture image section of red color selection and the $R^2$ filter, the $R^2$ and $G^2$ filters affect the picture image sections of red and green selection, whereas in the following group of six picture image sections the picture image sections of red and green color selection will be affected by the R' and G' filters; likewise, in the first group the picture image sections of red and yellow color selection will be affected by the R' and G' filters, whereas in the following group the picture image sections of red and yellow color selection will be affected by the $R^2$ and $G^2$ filters; so, also, in the first group, the picture image sections of red and blue color selection will be affected by the $R^2$ and $G^2$ filters and in the following group the picture image sections of red and blue will be affected by the R' and G' filters.

By being able to form these different combinations in pairs of various shades of reds and greens carried by the persistency of vision in the eye of the observer, the effect of balanced colors is carried from one group to another, each pair harmoniously linking with the others in the successive movement of the film, progressively continuing the illusion of colors in such delicate graduation as to eliminate gaps and reduce flicker to a minimum.

Where in this disclosure I have used the terms "pure red," "orange-red," "red," "green," "yellow-green," "blue-green," "yellow" and "blue" color or colors, whether applied to filters or color selections of the picture image sections, I wish to have it distinctly understood that I do not limit myself to any particular density or shade of these colors as one skilled in the art may find it convenient, when taking or projecting photographic records of a subject or scene, to first consider the color scale and govern the matter accordingly, choosing lighter or darker shades of color filters in order to properly render the color values. I am aware many a subject, where colors of short wave predominate, reds forming a secondary part, that one of the red filters used in the taking screen can be dispensed with, inserting an "orange" instead, but not requiring any change in my methods of projection. Also under certain light conditions it may be found desirable to use a light yellow filter either in front, back or between the lens to modify the predominating blue-violet rays.

While I prefer under my disclosure to arrange and use the color filters in the order described, if desired successful results rendering graduated color values can also be obtained by either substituting a yellow filter for the blue, or a blue filter for the yellow, the other filters remaining in the same order as above disclosed.

To make it plain, in my preferred method, the negative film upon exposure with the aid of a recurring color screen having six color filters, registers in groups of six picture image sections of color selection in the following order: red, green; red, yellow; red, blue. If a yellow filter is inserted in place of the blue, the order will then be—red, green; red, yellow; red, yellow, in which case the green will appear once, and the yellows twice, and the reds three times in each group of six picture image sections. If a blue filter is inserted in place of a yellow the order will then be—red, green; red, blue; red, blue; in which case the green will appear once, the blues twice and the reds three times in each group of six picture image sections.

It will be readily understood from the above, but I wish to make it plain, that in the successive rendering of the groups of six picture image sections of color selection, no matter which of the above-mentioned arrangements or order of the filters is followed, the picture image section of green color selection will necessarily register only once in every six picture image sections.

Having thus described my invention, I claim as new and desire to secure by Letters Patent:

1. A method of producing moving pictures in colors, which consists in taking on a panchromatic or orthochromatic negative film successive groups of six picture image sections, each section showing a color selection, three of which are of red color selection and alternately disposed in their relation to the other three picture image sections of the group of which one is of green, one of yellow and one of blue color selection; the making of a positive film therefrom and projecting it with the aid of recurring red and green color filters, the picture image sections of red color selection being colored by the red filter and each of the picture image sections of green, yellow and blue color selection being colored by the green filter.

2. A method of producing moving pictures in colors, which consists in taking on a panchromatic or orthochromatic negative film, successive groups of six picture image sections, each section showing a color selection, three of which are of red color selection and alternately disposed in their relation to the other three picture image sections of the group, of which only one is of green color selection and the remaining two are of primary color selection other than red, the making of a positive film therefrom and projecting it with the aid of recurring red and green filters; the picture image sections of red color selection being colored by the red color filter and the other picture image sections each being colored by the green color filter.

3. A method of projecting moving pictures in colors, which consists in projecting a moving picture positive film, having successive groups of six picture image sections, each section showing a color selection, three of the sections are of red color selection and alternately disposed in their relation to the other three picture image sections of the group, of which one is of green, one of yellow and one of blue color selection and each showing only once in every six picture image sections, with the aid of recurring red and green color filters, the picture image sections of red color selection being colored by the red filter and each of the picture image sections of the green, yellow and blue color selection being colored by the green filter, the red and green color projected images being overlapped on the screen by persistency of vision into colors approaching nature.

4. A method of projecting moving pictures in colors, which consists in projecting a moving picture positive film having continuing aspects of a subject or scene in successive groups of six picture image sections, three of which are of red color selection and alternately disposed in their relation to the other three picture image sections of the group, of which one is of green, one of yellow and one of blue color selection, with the aid of a recurring screen having four color filters, one of pure red, one of orange-red, one of blue-green and one of yellow green, and in a given group the picture image sections of green and blue color selection are colored by the blue-green filter and the picture image section of yellow color selection is colored by the yellow-green filter, whereas in the next following group the picture image sections of green and blue color selection are colored by the yellow-green filter and the picture image section of yellow color selection is colored by the blue-green filter and every other picture image section of red color selection is colored by the pure red filter and the intermediate picture image sections of red color selection are colored by the orange-red filter.

5. A method of projecting moving pictures in colors, which consists in projecting a moving picture positive film having continuing aspects of a scene or subject in successive groups of six picture image sections, three of which are red color selection and alternately disposed in their relation to the other three picture image sections of the group, of which one is of green, one of yellow and one of blue color selection, with the aid of a recurring screen having four color filters, divided in pairs, one pair consisting of pure red and yellow-green color filters and designated as $R'$ and $G'$ and the other pair of orange-red and blue-green color filters designated as $R^2$ and $G^2$ and in a given group of six picture image sections representing three pairs of red and green picture image sections, one pair comprising red and its next following green color selection is colored by the $R^2$ and $G^2$ filters respectively, and one pair comprising the red and its next following yellow color selection is colored by the $R'$ and $G'$ filters respectively, and the third pair of the group comprising red and its next following blue color selection is colored by the $R^2$ and $G^2$ filters respectively, whereas in the next following group of six picture image sections the coloring order reverses in relation to the pairs, the pair of red and green is colored by the $R'$ and $G'$ filters respectively, the pair of red and yellow is colored by the $R^2$ and $G^2$ filters respectively, and the third pair of the group red and blue is colored by the $R'$ and $G'$ filters respectively, thus the pairs of picture image sections of one group producing color sensations differing from those of the next following group.

JOSEPH SHAW.